US010605181B2

(12) United States Patent
Dudar

(10) Patent No.: US 10,605,181 B2
(45) Date of Patent: Mar. 31, 2020

(54) SYSTEMS AND METHODS FOR INTAKE SYSTEM HYDROCARBON TRAP DIAGNOSTICS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 237 days.

(21) Appl. No.: 15/882,852

(22) Filed: Jan. 29, 2018

(65) Prior Publication Data

US 2019/0234326 A1 Aug. 1, 2019

(51) Int. Cl.

| | |
|---|---|
| ***G06Q 10/06*** | (2012.01) |
| ***G06Q 10/08*** | (2012.01) |
| ***F02D 41/00*** | (2006.01) |
| ***F02M 25/08*** | (2006.01) |
| ***F02D 29/02*** | (2006.01) |
| ***F02D 41/14*** | (2006.01) |

(52) U.S. Cl.

CPC ......... *F02D 41/0037* (2013.01); *F02D 29/02* (2013.01); *F02D 41/0032* (2013.01); *F02D 41/1456* (2013.01); *F02M 25/0827* (2013.01); *F02M 25/089* (2013.01); *F02M 25/0836* (2013.01); *Y10S 903/905* (2013.01)

(58) Field of Classification Search

CPC ............. F02D 41/0037; F02D 41/1456; F02D 41/0032; F02D 29/02; F02D 41/042; F02D 41/004; F02D 2200/703; F02D 13/0219; F02D 19/084; F02M 25/0836; F02M 25/089; F02M 25/0827; F02M 35/0218; F02M 25/0854; F02M 25/08; F02M 25/0809; F02M 35/10222; B60W 10/08; B60W 20/40; B60W 10/30; B60W 10/06; Y10S 903/905; Y10S 903/93; Y10S 903/902; Y02T 10/36

See application file for complete search history.

(56) References Cited

U.S. PATENT DOCUMENTS 9,163,571 B2 10/2015 Dudar et al.
2004/0000066 A1* 1/2004 Ely ........................... F26B 5/04 34/60
2005/0011185 A1* 1/2005 Annoura ............. F02D 41/0032 60/289
2017/0234246 A1 8/2017 Dudar

* cited by examiner

*Primary Examiner* — Brandi N Hopkins
(74) *Attorney, Agent, or Firm* — Geoffrey Brumbaugh; McCoy Russell LLP

(57) ABSTRACT

Methods and systems are provided for diagnostics of an intake air system hydrocarbon (AIS HC) trap during vehicle-off conditions. In one example, a method may include generating fuel vapor in a fuel tank, directing the generated vapor to the AIS HC trap, and then actively purging the AIS HC trap. Degradation of the AIS HC trap may be indicated based on an exhaust air fuel ratio during the active purging of the AIS HC trap.

20 Claims, 5 Drawing Sheets

SYSTEMS AND METHODS FOR INTAKE SYSTEM HYDROCARBON TRAP DIAGNOSTICS

FIELD

The present description relates generally to methods and systems for performing diagnostics of a hydrocarbon trap coupled to an engine air intake system.

BACKGROUND/SUMMARY

In internal combustion engines, the fuel vapor canister primarily adsorbs refueling vapors, as refueling and diurnal vapors are sealed within the fuel tank by a fuel tank isolation valve. An air intake system hydrocarbon (AIS HC) trap may capture hydrocarbons emitted by leaky injectors and/or from fuel that may puddle in the engine intake. The AIS HC trap may also capture uncombusted fuel that is trapped within the engine cylinders themselves. An AIS HC trap is required for vehicles to be classified as practically zero emissions vehicles (PZEVs).

The contents of the AIS HC trap may be purged to engine intake during engine operation by opening an intake throttle plate, thus directing fresh air through the trap and desorbing bound hydrocarbons for combustion. However, hybrid vehicles may operate for prolonged periods without combusting fuel, thus limiting opportunities to purge the fuel vapor canister and AIS HC trap for combustion. Prolonged periods without AIS HC trap purge may cause degradation of the AIS HC trap. Further, liquid inhalation may damage the adsorbent material present in the HC trap.

One example approach for periodically or opportunistically purging the AIS HC trap is shown by Dudar in U.S. Patent Application No. 20170234246. Therein, the AIS HC trap is purged to a fuel vapor canister during an engine non-combusting condition by reverse rotating the engine via an electric motor. Reverse rotation of the engine causes atmospheric air to enter an intake of the engine via an exhaust of the engine, desorbing hydrocarbons bound to the air intake system hydrocarbon trap.

However, the inventors herein have recognized potential issues with such systems. As one example, as the AIS HC trap is purged, degradation of the HC trap is not diagnosed. Operating an engine with a degraded HC trap and purging a degraded HC trap may result in an increase in bleed emissions.

In one example, the issues described above may be addressed by an engine method comprising: during unfueled cranking of an engine, testing for degradation of an adsorbent material positioned in an intake of the engine by directing fuel vapor to the adsorbent material with a throttle coupled to the engine intake in closed position, and indicating presence or absence of degradation of the adsorbent material based on an air fuel ratio state in an exhaust system of the engine upon opening the throttle. In this way, by saturating an AIS HC trap with fuel vapor during a vehicle key-off condition, and then monitoring an exhaust air fuel ratio as the AIS HC trap is purged, a degradation of the AIS HC trap may be detected.

In one example, a diagnostic routine of the AIS HC trap may be opportunistically carried out during vehicle key-off conditions when the engine is not operated. The engine may be reverse rotated to remove any remaining fuel vapor from the engine intake manifold to the atmosphere via the exhaust passage. Once an exhaust air fuel ratio, as estimated via a heated exhaust gas oxygen (HEGO) sensor, becomes leaner than stoichiometric, indicating absence of fuel vapor in the exhaust passage, the fuel system may be isolated, and fuel vapor may be generated in the fuel tank by operating the fuel pump. In response to the fuel pressure reaching a threshold pressure, the fuel vapor from the fuel system may be routed to the AIS HC trap via a fuel vapor canister. After a threshold time has elapsed since routing of the fuel vapor to the AIS HC trap, it may be inferred that the vapor has been adsorbed by the AIS HC trap. The engine may be cranked unfueled with the intake throttle closed in order to route any remaining, un-adsorbed, vapor from the intake manifold to the atmosphere via the exhaust passage. The intake throttle may then be opened while continuing to spin the engine, unfueled, such that the ambient air flow may be used to purge the AIS HC trap. The fuel vapor from the AIS HC trap may be desorbed and routed to the exhaust passage with the ambient airflow. Flow of desorbed fuel vapor through the exhaust passage may cause the exhaust air fuel ratio to change from leaner than stoichiometric to richer than stoichiometric air fuel ratio. The AIS HC trap may be diagnosed to be degraded responsive to the exhaust air fuel ratio remaining leaner than stoichiometric during the AIS HC trap purge. Upon detection of degradation of the AIS HC trap, upon completion of an immediately subsequent engine operation, the engine may be spun unfueled to route any remaining fuel vapors in the intake system to the exhaust catalyst via the engine cylinders.

In this way, by opportunistically using existing engine components, such as heated exhaust oxygen gas sensor, the need for additional sensors and/or equipment for diagnostics of an AIS HC trap may be reduced or eliminated. By using a fuel pump to generate fuel vapor, diagnostics of the AIS HC trap may be carried out even during engine-off conditions. The technical effect of carrying out the diagnostics of the AIS HC trap during engine-off conditions is that during the diagnostics routine, the HC trap is purged, thereby limiting bleed emissions. Overall, by regularly monitoring the health of the AIS HC trap, emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
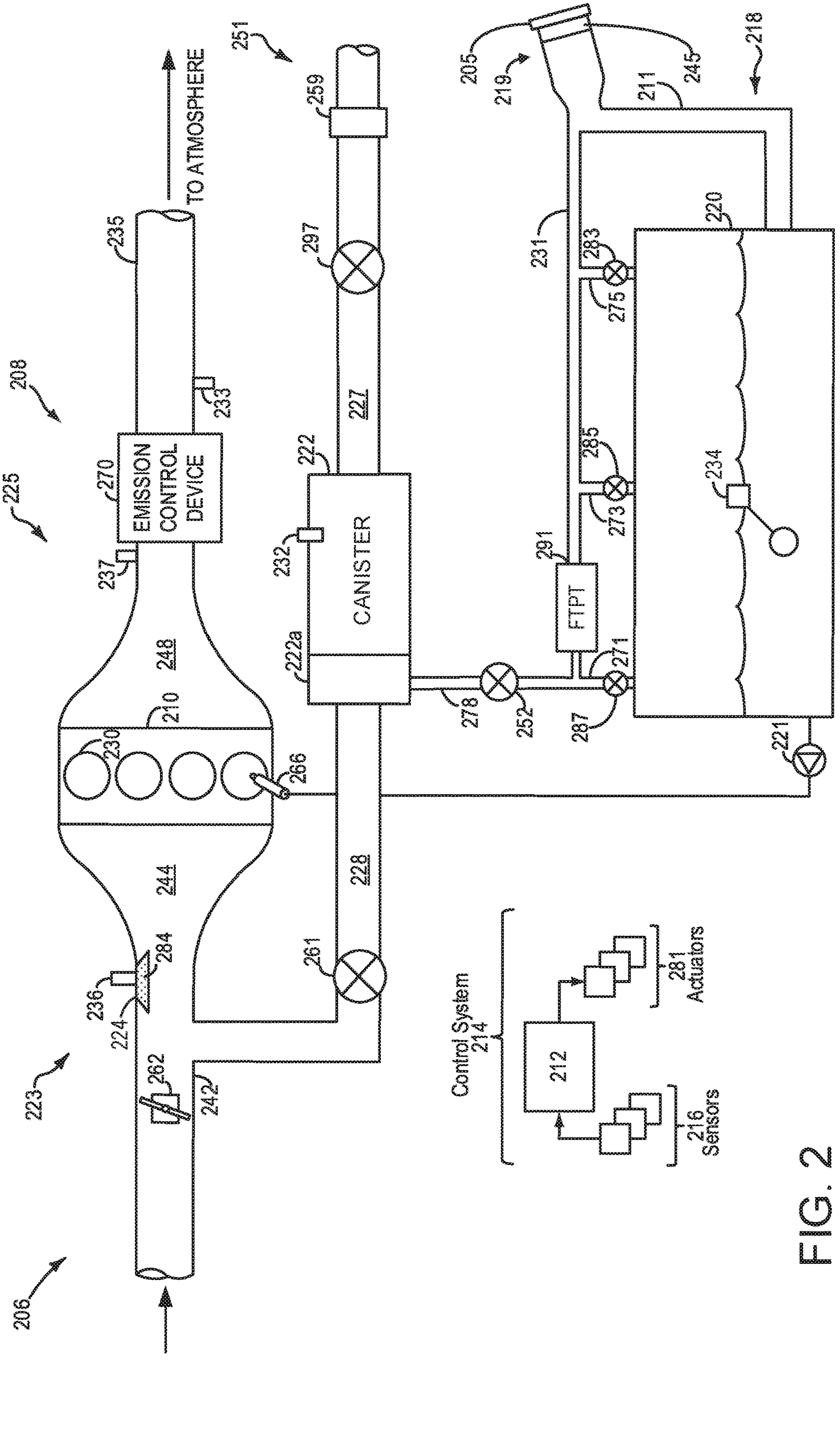
FIG. 2 schematically shows an example vehicle system with an intake air system hydrocarbon (AIS HC) trap.
Figure 3:
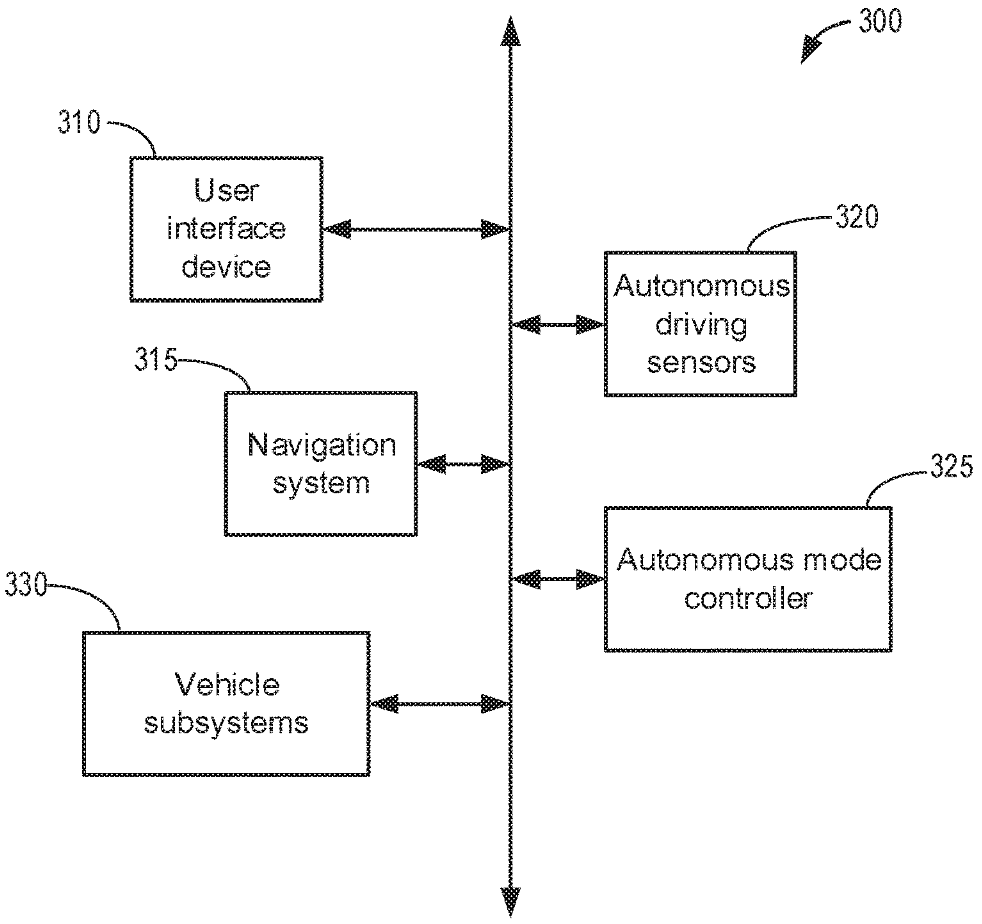
FIG. 3 schematically illustrates a block diagram of an example autonomous driving system.
Figure 4:
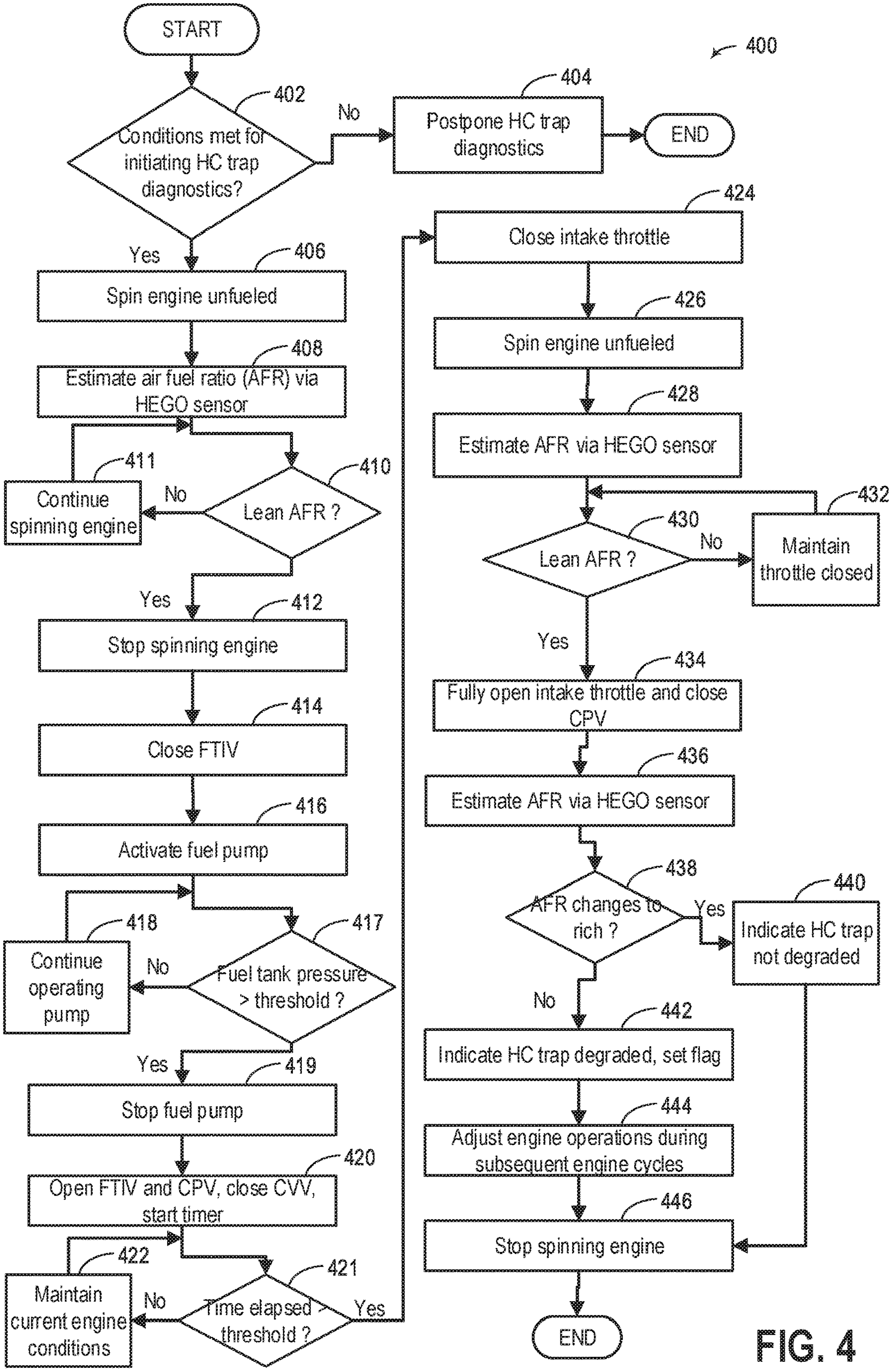
FIG. 4 shows a flow chart illustrating a diagnostic routine for diagnosing a degraded AIS HC trap.
Figure 5:
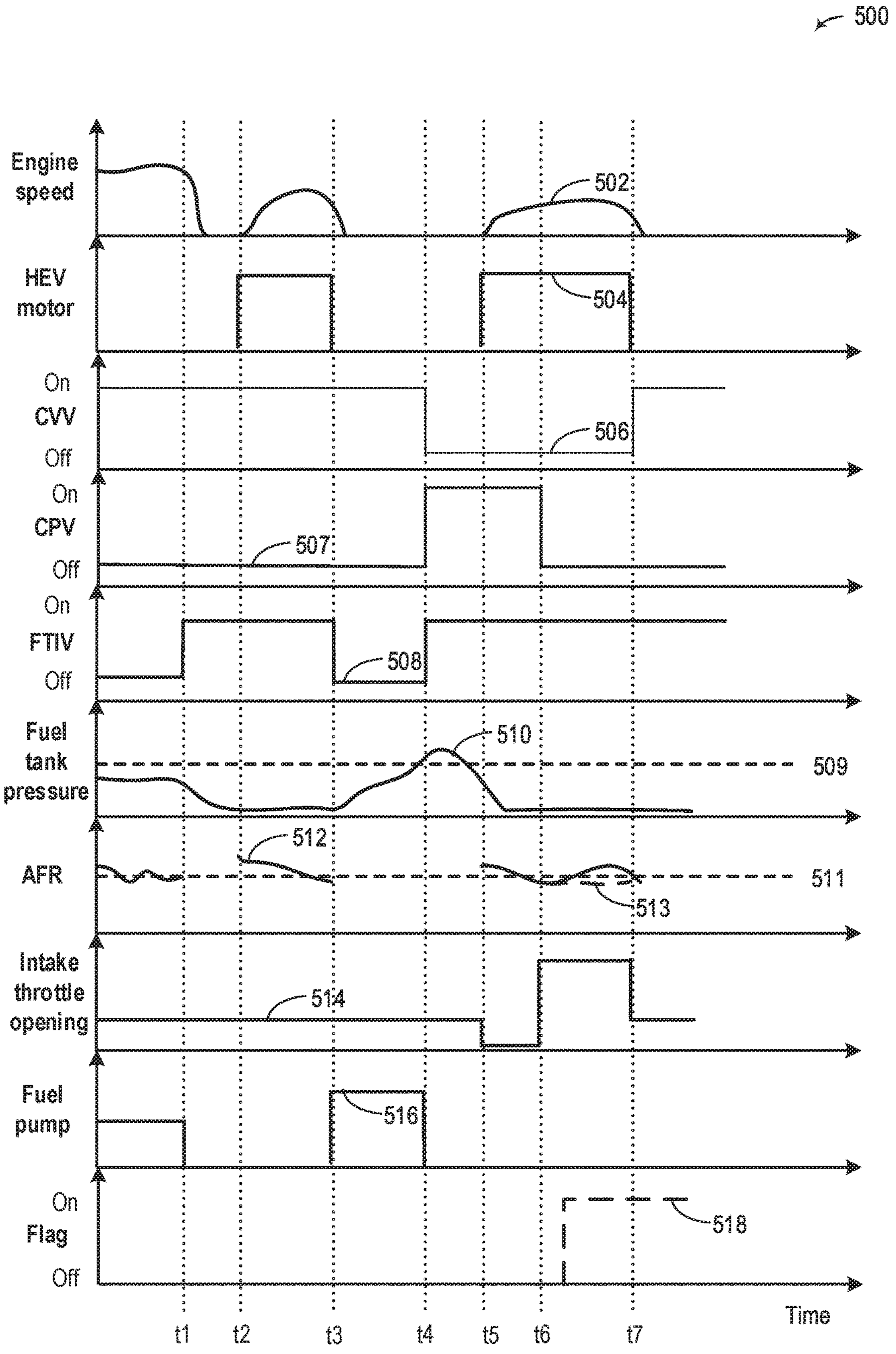
FIG. 5 shows an example diagnosis of an AIS HC trap during an engine-off condition, according to the present disclosure

The following description relates to systems and methods for diagnostics of an intake air system hydrocarbon (AIS HC) trap. The system and methods may be applied to a vehicle system capable of spinning an engine unfueled in reverse with an electric motor, such as the hybrid vehicle system depicted in FIG. 1. The engine may be coupled to an emissions control system including an AIS HC trap, as depicted in FIG. 2. AIS HC trap diagnostics may in some examples be carried out in an autonomous vehicle, where FIG. 3 depicts an example autonomous vehicle control system. During a vehicle key-off condition, an engine controller of the vehicle may be configured to perform an example routine to indicate degradation of an AIS HC trap. In an example, a diagnostic routine illustrated in FIG. 4 may be performed. Example engine operations to enable AIS HC trap diagnostics during a vehicle key-off condition are shown in FIG. 5.

Figure 1:
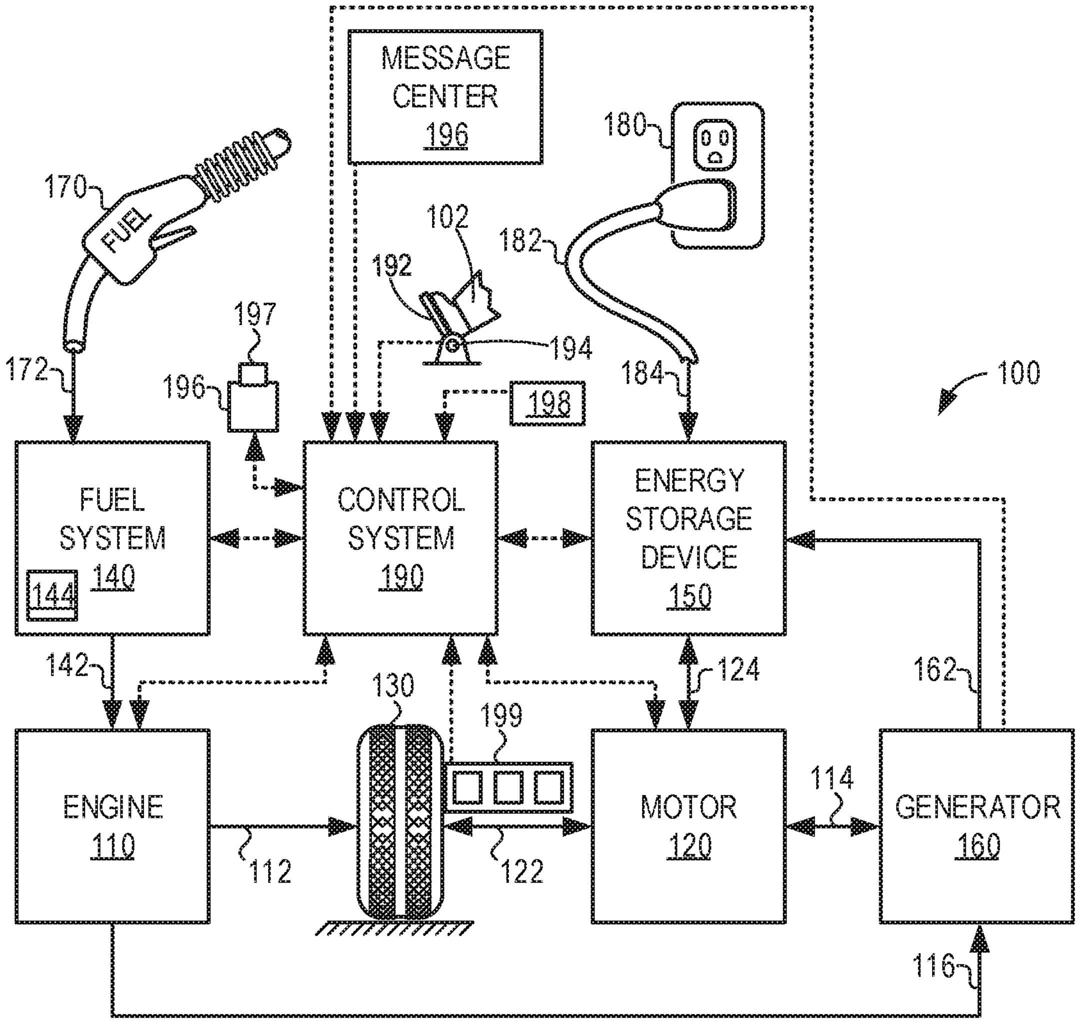
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130 (either directly, or via motor 120), where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120, which may in turn provide a generator function to convert the engine output to electrical energy, where the electrical energy may be stored at energy storage device 150 for later use by the motor.

In some embodiments, motor 120 may be operated to rotate engine 110. Generator 160 may also be operated to rotate engine 110 in addition to or as an alternative to motor 120. As an example, motor 120 may be operated as a starter motor by rotating engine 110 during a cold start operation. Motor 120 and/or generator 160 may rotate engine 110 without providing fuel to the engine for combustion. For example, during an electric-only mode of operation, rotating the engine may allow for the rotational velocity a rotating transmission component to be maintained or adjusted while concurrently adjusting the torque provided to drive wheels 130. In some scenarios, the engine may be rotated unfueled by the motor and/or generator in order to generate intake vacuum without expending fuel. Such unfueled rotation may be accomplished while the motor and/or generator are being utilized to propel the vehicle, and/or while the motor and/or generator are disengaged from the drive wheels (e.g., while the vehicle is parked, at an idle-stop, during decel fuel shutoff mode). In some examples, the engine may be rotated unfueled during diagnostics of engine components such as an intake air system hydrocarbon trap. An example method utilizing unfueled engine rotation is depicted in FIG. 4.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 4, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 193 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication via human-machine interface 194.

Human-machine interface 194 may include a vehicle instrument panel 195. The vehicle instrument panel 195 may include indicator light(s) and/or a text-based display in which messages are displayed to an operator. In some embodiments, the vehicle instrument panel 195 may communicate audio messages to the operator with or without displaying a visual message. The vehicle instrument panel 195 may also include various input portions for receiving an operator input, such as buttons, touch screens, voice input/recognition, etc. For example, the vehicle instrument panel 195 may include a refueling button 196 which may be manually actuated or pressed by a vehicle operator to initiate refueling. For example, as described in more detail below, in response to the vehicle operator actuating refueling button 196, a fuel tank in the vehicle may be depressurized so that refueling may be performed.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system 100 of FIG. 1.

The engine system 208 may include an engine 210 having a plurality of cylinders 230. The engine 210 may be the engine 110 of FIG. 1. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. An exhaust gas oxygen sensor 237 may be coupled to the exhaust passage 235. The oxygen sensor 237 may be linear oxygen sensors or UEGO (universal or wide-range exhaust gas oxygen), two-state oxygen sensors or EGO, or a HEGO (heated EGO). The engine exhaust 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer **222*a* (or buffer region), each of the canister and the buffer comprising the adsorbent. As shown, the volume of buffer 222*a* may be smaller than (e.g., a fraction of) the volume of canister 222. The adsorbent in the buffer 222*a* may be same as, or different from, the adsorbent in the canister (e.g., both may include charcoal). Buffer 222*a* may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222**. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

During a vehicle key-off condition, the fuel system 218 and the evaporative emissions control system 251 may be opportunistically used for diagnostics of engine components such as the AIS HC trap 224. The fuel tank 220 may be isolated by actuating the FTIV 252 to a closed position and fuel vapor may be produced by operating a fuel pump 221 coupled to the fuel tank 220. A vapor pressure may be estimated in the fuel tank via a fuel tank pressure transducer 291 coupled to the fuel tank 220, and in response to the vapor pressure increasing to above a threshold pressure, each of the throttle 262 and the CVV 297 may be closed, each of the FTIV 252 and the CPV 261 may be opened, and fuel vapor may be directed from the fuel tank 220 to the engine intake manifold 244. Upon directing the fuel vapor to the adsorbent material in the AIS HC trap 224, the fuel vapor may be allowed to dwell in the engine intake for a threshold duration, and after the threshold duration has elapsed, the engine may be rotated, unfueled, with the throttle 262 closed, until the exhaust air fuel ratio, as estimated via oxygen sensor 237, is leaner than stoichiometric air fuel ratio, and then the throttle 262 may be actuated to a fully open position. Indication of presence of degradation of the AIS HC trap 224 is in response to the exhaust air fuel ratio changing from leaner than stoichiometric air fuel ratio to richer than leaner than stoichiometric air fuel ratio upon opening the throttle 262 while spinning the engine, unfueled. Indication of absence of degradation of the AIS HC trap 224 is in response to the exhaust air fuel ratio remaining leaner than stoichiometric air fuel ratio even upon opening the throttle 262 while cranking the engine, unfueled.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, fuel tank pressure transducer (pressure sensor) 291, and canister temperature sensor 232. Other sensors such as pressure, temperature, air/fuel ratio, and composition sensors may be coupled to various locations in the vehicle system 206. As another example, the actuators may include intake throttle 262, fuel pump 221, fuel tank isolation valve 253, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. In one example, during AIS HC trap 224 diagnostics, the controller 212 may send a signal to the fuel pump 221 to operate the pump 221 for generating fuel vapors in the fuel tank 220. The controller may then actuate the FTIV 252 to an open position to route the fuel vapor to the AIS HC trap 224. The controller may rotate the engine 210 via an electric motor (such as motor 120 of FIG. 1) to purge the AIS HC trap 224 and monitor change in exhaust air fuel ratio via the oxygen sensor 237.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode. For example, a wakeup capability may enable a circuit to wake the controller in order to opportunistically conduct diagnostics of the AIS HC trap 224.

Diagnostic routines for the AIS HC trap 22 may be conducted in a vehicle configured as an autonomous vehicle and an example autonomous driving system is discussed below with regard to FIG. 3. FIG. 3 is a block diagram of an example autonomous driving system 300 that may operate the vehicle system 100, described above at FIG. 1. The autonomous driving system 300, as shown, includes a user interface device 310, a navigation system 315, at least one autonomous driving sensor 320, and an autonomous mode controller 325.

The user interface device 310 may be configured to present information to vehicle occupants, under conditions wherein a vehicle occupant may be present. However, it may be understood that the vehicle may be operated autonomously in the absence of vehicle occupants, under certain conditions.

The presented information may include audible information or visual information. Moreover, the user interface device 310 may be configured to receive user inputs. Thus, the user interface device 310 may be located in the passenger compartment (not shown) of the vehicle. In some possible approaches, the user interface device 310 may include a touch-sensitive display screen.

The navigation system 315 may be configured to determine a current location of the vehicle using, for example, a Global Positioning System (GPS) receiver configured to triangulate the position of the vehicle relative to satellites or terrestrial based transmitter towers. The navigation system 315 may be further configured to develop routes from the current location to a selected destination, as well as display a map and present driving directions to the selected destination via, for example, the user interface device 310.

The autonomous driving sensors 320 may include any number of devices configured to generate signals that help navigate the vehicle. Examples of autonomous driving sensors 320 may include a radar sensor, a lidar sensor, a vision sensor (e.g. a camera), vehicle to vehicle infrastructure networks, or the like. The autonomous driving sensors 320 may enable the vehicle to "see" the roadway and vehicle surroundings, and/or negotiate various obstacles while the vehicle system 100 is operating in autonomous mode. The autonomous driving sensors 320 may be configured to output sensor signals to, for example, the autonomous mode controller 325.

The autonomous mode controller 325 may be configured to control one or more subsystems 330 while the vehicle is operating in the autonomous mode. Examples of subsystems 330 that may be controlled by the autonomous mode controller 325 may include a brake subsystem, a suspension subsystem, a steering subsystem, and a powertrain subsystem. The autonomous mode controller 325 may control any one or more of these subsystems 330 by outputting signals to control units associated with subsystems 330. In one example, the brake subsystem may comprise an anti-lock braking subsystem, configured to apply a braking force to one or more of wheels. Discussed herein, applying the braking force to one or more of the vehicle wheels may be referred to as activating the brakes. To autonomously control the vehicle, the autonomous mode controller 325 may output appropriate commands to the subsystems 330. The commands may cause the subsystems to operate in accordance with the driving characteristics associated with the selected driving mode. For example, driving characteristics may include how aggressively the vehicle accelerates and decelerates, how much the vehicle space leaves behind a front vehicle, how frequently the autonomous vehicle changes lanes, etc.

In this way, the components of FIGS. 1-3 enable a system comprising: a vehicle, including an autonomous vehicle and/or a hybrid vehicle, an electric machine, an engine including an intake passage and an exhaust passage, an intake throttle coupled to the intake passage, a fuel vapor canister selectively coupled to the engine intake passage via a canister purge valve (CPV), a fuel tank that supplies fuel to the engine, the fuel tank selectively coupled to the fuel vapor canister via a fuel tank isolation valve (FTIV), a fuel pump housed in the fuel tank, an air intake system hydrocarbon (AIS HC) trap positioned in the engine intake passage, a heated air exhaust gas oxygen (HEGO) sensor coupled to the exhaust passage, and a controller with computer readable instructions stored on non-transitory memory that when executed during an engine-off condition, cause the controller to: isolate the fuel tank by closing the FTIV and operating the fuel pump to generate fuel vapors, route the generated fuel vapor to the AIS HC trap by opening the FTIV and the CPV, spin the engine, unfueled, via the electric machine and open the throttle to a wide open position after stopping the route of fuel vapor to the AIS HC trap, and responsive to an exhaust air fuel ratio being leaner than stoichiometric air fuel ratio, indicate degradation of the AIS HC trap.

FIG. 4 shows an example method 400 that may be implemented to carry out diagnostics of an air intake system hydrocarbon (MS HC) trap (such as AIC HC trap 224 of FIG. 2) during an engine non-combusting condition. Instructions for carrying out method 400 and the rest of the methods included herein may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

At 402, the method includes determining if conditions are met for initiating AIS HC trap diagnostics. In one example, conditions for initiating AIS HC trap diagnostics may include a vehicle-off condition when the vehicle is unoccupied (any passenger is not present in the vehicle). Seat load cells, onboard camera(s), and/or door sensing technology may be utilized to ensure that the vehicle is not occupied. In another example, the AIS HC trap diagnostics may be carried out during an autonomous vehicle mode when the vehicle is operated without a human driver and when the vehicle is not being propelled by engine torque. The vehicle operation may be controlled from a remote location or may be pre-programed in the controller memory. During vehicle operation in the autonomous mode, the diagnostics may be opportunistically carried out when the vehicle is stopped at a traffic signal or immediately upon completion of a drive cycle. In yet another example, the AIS HC trap diagnostics may be carried out responsive to a wakeup of the controller after a predetermined duration after a key-off event. Conditions for initiating diagnostics of the AIS HC trap includes confirmation that the engine sensors such as the exhaust oxygen sensor, etc. are not degraded and in general there any no diagnostic codes (flags) set indicating degradation of any engine component. Further, prior to initiating the AIS HC trap diagnostics, the controller may verify if a predetermined duration of time has elapsed since a prior AIS HC trap diagnostic routine was carried out. In some examples, such a predetermined duration of time may comprise one day, greater than one day but less than two days, greater than two days, etc. In other examples, the predetermined duration may include a number of miles driven, number of hours of vehicle operation, or other parameter.

If it is determined that the conditions for initiating the AIS HC trap diagnostics are not met, at 404, the AIS HC trap diagnostic routine may be postponed until the conditions are being met. In some examples, if the AIS HC trap diagnostic conditions are not met, current operating parameters may be continued until the AIS HC trap diagnostic conditions are met. Such operating parameters may include, if the vehicle is operating, fuel being delivered to one or more engine cylinders from the fuel tank via fuel injectors of the fuel system and combustion of air and fuel being carried out in the cylinders. Hydrocarbons emitted by any leaks in the injectors and/or from a fuel puddle in the engine intake manifold may be adsorbed by the AIS HC trap. A fuel tank isolation valve (such as FTIV 252 in FIG. 2) positioned within a conduit between the fuel tank and a fuel vapor canister may be maintained in a closed position. A canister purge valve (such as CPV 262 in FIG. 2) positioned within a purge line coupling the fuel vapor canister to the engine intake manifold may be maintained in a closed position. A canister vent valve (such as CVV 297 in FIG. 2) positioned within a vent line coupling the fuel vapor canister to the atmosphere may be maintained in an open position. Engine torque produced by combustion in the engine cylinders may be used to propel the vehicle.

If it is determined that conditions for initiating the AIS HC trap diagnostics are met, at 406, the routine includes rotating or spinning the engine unfueled at a predetermined speed (e.g., predetermined RPM). Rotating the engine unfueled may cause any unburnt and un-adsorbed fuel vapors present in the engine intake system and the engine cylinders to be routed to the atmosphere via the exhaust passage. Due to the lower pressure created in the intake manifold by engine rotation, ambient air may enter the engine intake manifold via the intake throttle and flow to the exhaust passage carrying along the HC vapors. Rotating the engine unfueled may comprise rotating the engine via a motor (such as motor 120 in FIG. 1), where the motor may be powered via the onboard battery (such as energy storage device 150 in FIG. 1). In a non-hybrid vehicle, the engine may be rotated via a starter motor and a battery of the vehicle. The speed of the engine may be controlled via the motor, to the predetermined speed. The predetermined engine speed may comprise a speed at which robust airflow is regenerated through the engine intake manifold and engine cylinders that is able to remove any HC vapor while the engine is being spun. In one example, the predetermined speed may be lower than 500 rpm.

As the HC vapor is routed to the atmosphere by the exhaust passage, the HC vapor along with the ambient air flows through an exhaust gas oxygen sensor (such as a heated exhaust gas oxygen sensor 237 in FIG. 2). At 408, an exhaust air fuel ratio (AFR) may be estimated via the heated exhaust gas oxygen (HEGO) sensor. Due to the presence of HC vapor in the airflow through the HEGO sensor, the exhaust AFR may be estimated to be richer than stoichiometric AFR. Stoichiometric AFR denotes a 1:1 air fuel ratio and richer than stoichiometric AFR denotes a higher portion of fuel (vapor) compared to air.

At 410, the routine includes determining if the AFR as estimated by the HEGO sensor is leaner than stoichiometric AFR. Leaner than stoichiometric AFR denotes a higher portion of air compared to fuel. Once the entire volume of unburnt and unabsorbed HC vapor is routed to the atmosphere via the exhaust passage, as the engine is rotated, unfueled, ambient air (without the presence HC vapor) may flow via the HEGO sensor. Therefore, the richer than stoichiometric AFR caused by the presence of HC vapors in the exhaust airflow may change to leaner than stoichiometric AFR.

If it is determined that the AFR as estimated by the HEGO sensor is not leaner than stoichiometric AFR, it may be inferred that there is presence of HC vapor in the exhaust airflow causing the AFR to remain richer than stoichiometric AFR. A richer than stoichiometric AFR denotes a higher portion of fuel compared to air. At 411, the engine spinning is continued such that air continues to flow from the intake manifold to the exhaust passage via the engine cylinders carrying along the HC vapors until the entire volume of trapped vapors are removed. If it is determined that the AFR is leaner than stoichiometric AFR, it may be inferred that the entire volume of trapped HC vapor from the engine intake manifold and cylinders have been removed to the atmosphere and ambient air (without HC vapor) is flowing through the exhaust passage. Once the trapped HC vapor is removed from the engine system, at 412, the controller may send a signal to the motor to stop rotating the engine. In this way, by removing all the trapped hydrocarbons from the engine cylinders (as confirmed via a leaner than stoichiometric exhaust AFR), it may be ensured that the HCs trapped in the engine cylinders and the intake manifold may not influence the AIS HC trap diagnostics.

At 414, the controller may send a signal to the actuator coupled to the FTIV to close the FTIV. Since, during the AIS HC trap diagnostics, the engine is in a non-combusting condition, the FTIV may have been in an open position to allow fuel vapor generated in the fuel tank to be flow to the vapor canister wherein the vapor may be adsorbed. If the FTIV was in a closed position, the position of the FTIV may be maintained to be closed. By closing the FTIV valve, the fuel tank may be isolated from the fuel vapor canister and the engine intake manifold.

At 416, a fuel pump (such as fuel pump 221 in FIG. 2) may be activated to generate vapor in the fuel tank. The controller may send a signal to the actuator coupled to the fuel pump to activate the pump. As the fuel pump is operated, the fuel in the tank may be agitated causing fuel to vaporize, thereby creating fuel vapor in the fuel tank. Since the FTIV is closed, the fuel tank is isolated from the remaining engine components and the fuel vapor may not escape from the fuel tank, thereby causing the fuel tank pressure to increase.

At 417, the routine includes determining if the fuel tank pressure as estimated via a fuel tank pressure transducer (such as FTPT 291 in FIG. 2) coupled to the fuel tank is higher than a threshold pressure. The threshold pressure may correspond to a volume of fuel vapor if routed to the AIS HC trap may saturate the trap. The threshold pressure may be calibrated based on the absorption capacity of the AIS HC trap. In one example, the threshold pressure may be 6 inch water. If it is determined that the fuel tank pressure is lower than the threshold pressure, at 418, the fuel pump may be continued to be operated to generate fuel vapor. If it is determined that the fuel tank pressure is higher than the threshold pressure, it may be inferred that an amount of fuel vapor desired to saturate the AIS HC trap has been generated and further fuel vapor generation is not desired. At 419, the controller may send a signal to the actuator coupled to the fuel pump to stop operating the fuel pump.

At 420, the controller may send a signal to each of the actuator coupled to the FTIV and the actuator coupled to the CPV to open the FTIV and the CPV, respectively. By opening the FTIV and the CPV, the fuel vapor generated in the fuel tank may be routed from the fuel tank to the engine intake manifold via the fuel vapor canister and the purge line. The controller may send a signal to the actuator coupled to the CVV to actuate the CVV to a closed position. As the CVV is closed, fuel vapor may not escape to the atmosphere via the vent line. A smaller portion of the fuel vapor may be adsorbed by the fuel vapor canister while the remaining, larger portion of the fuel vapor may be routed to the engine intake manifold. A timer may be started when the FTIV and CPV are opened and the CVV are closed. The timer records the duration of time elapsed since the initiation of fuel vapor routing from the fuel tank to the intake manifold.

At 421, the routine includes determining if the time elapsed since the initiation of fuel vapor routing is higher than a threshold duration. The threshold duration may be calibrated based on the time desired for the entire volume of fuel vapor to flow from the fuel tank to the intake manifold and be adsorbed by the AIS HC trap. In one example, the threshold duration may 30 seconds. If it is determined that the time elapsed is shorter than the threshold duration, it may be inferred that additional time may be required for the fuel vapor to be adsorbed by the AIS HC trap and current engine conditions may be maintained.

If it is determined that the time elapsed since the initiation of fuel vapor routing is higher than the threshold duration, it may be inferred that the fuel vapor routed from the fuel tank may be adsorbed by the AIS HC trap. In this way, by actuating a FTIV to a closed position, operating a fuel pump coupled to the fuel tank until a fuel vapor pressure in the fuel tank increases to a threshold pressure, and then routing fuel vapor from the fuel tank to the AIS HC trap, the trap may be saturated with hydrocarbons.

At 424, the intake throttle may be actuated to a completely closed position such that ambient air may not enter the engine intake manifold via the intake throttle. At 426, the controller may send a signal to the motor to spin the engine, unfueled, at the predetermined engine speed. As the engine is spun, any un-adsorbed fuel vapor remaining in the engine intake manifold may be routed to the engine exhaust manifold via the engine cylinders. At 428, an exhaust air fuel ratio (AFR) may be estimated via the HEGO sensor housed in the exhaust passage. As the fuel vapor flows through the HEGO, the exhaust AFR may be estimated by the HEGO sensor to be richer than stoichiometric AFR.

At 430, the routine includes determining if the AFR as estimated by the HEGO sensor is leaner than stoichiometric AFR. Once the entire volume of un-adsorbed HC vapor is routed to the atmosphere via the exhaust passage, as the engine is rotated, unfueled, air remaining in the engine system (without the presence HC vapor) may flow via the HEGO sensor. Therefore, the richer than stoichiometric AFR caused by the presence of HC vapors in the exhaust airflow may change to leaner than stoichiometric AFR.

If it is determined that the AFR as estimated by the HEGO sensor is not leaner than stoichiometric AFR, it may be inferred that there is presence of HC vapor in the exhaust airflow causing the AFR to remain richer than stoichiometric AFR. At 432, the engine spinning is continued with the throttle closed such that the un-adsorbed HC vapors are removed. If it is determined that the AFR is leaner than stoichiometric AFR, it may be inferred that the entire volume of trapped HC vapor from the engine intake manifold has been removed to the atmosphere and air (without HC vapor) is flowing through the exhaust passage. Once the HEGO sensor reading changes to leaner than stoichiometric AFR, at 434, the controller may send a signal to the throttle place to fully open the intake throttle (to a wide open throttle position), thereby allowing ambient air to flow into the engine intake manifold via the intake throttle. Also, the controller may send a signal to the actuator coupled to the CPV to actuate the CPV to a completely closed position. By closing the CPV and maintaining the fuel pump in a deactivated condition, routing of any additional fuel vapor from the fuel tank to the intake manifold may be stopped.

As ambient air flows through the engine intake manifold housing the AIS HC trap while the engine is being rotated, the intake manifold pressure may then stimulate desorption of hydrocarbons from the AIS HC trap. The ambient airflow from the intake throttle may route the desorbed HCs to the atmosphere via the exhaust manifold.

At 436, an exhaust air fuel ratio (AFR) may be estimated via the HEGO sensor housed in the exhaust passage. At 438, the routine includes determining if the exhaust AFR changes from leaner than stoichiometric AFR to richer than stoichiometric AFR. As the HCs flow through the HEGO sensor housed in the exhaust passage, the exhaust AFR as estimated by the HEGO sensor may change from leaner than stoichiometric AFR to richer than stoichiometric AFR. If it is determined that the exhaust AFR changes from leaner than stoichiometric AFR to richer than stoichiometric AFR, it may be inferred that the AIS HC trap is capable of adsorbing HCs (fuel vapor) and may also desorb the HC when ambient air flows through the HC trap under intake manifold pressure conditions. In this way, the AIS HC trap may be actively purged by cranking the engine, unfueled, and actuating the throttle to a wide open position to flow ambient air to the engine exhaust manifold via the AIS HC trap. Prior to desorbing the HC from the HC trap, by removing all the un-desorbed fuel vapor from the engine system (as confirmed via a leaner than stoichiometric exhaust AFR), it may be ensured that the richer than stoichiometric exhaust AFR is caused by the HCs flowing from the AIS HC trap to the atmosphere via the exhaust passage (not from un-diffused fuel vapor). At 440, the routine includes indicating that the AIS HC trap is not degraded.

However, if it is determined that even as ambient air is routed through the AIS HC trap, the exhaust AFR does not change to richer than stoichiometric AFR, it may be inferred that HCs are not being desorbed from the AIS HC trap. In one example, the HC tap may not have been able to adsorb the fuel vapors when the fuel vapors from the fuel tank were routed to the HC trap. At 442, a diagnostic code (flag) may be set indicating degradation of the AIS HC trap.

Since the AIS HC trap is degraded, at 444, engine operations during subsequent engine cycles may be adjusted. In one example, at the completion of the engine may be spun unfueled to route any remaining fuel vapors in the intake system to the exhaust catalyst via the engine cylinders. The vapors may be treated at the catalyst. If fuel vapors remain in the engine cylinders, the vapors may be combustion during a subsequent engine cycle. In this way, fuel vapors in the air intake system may be removed during conditions when the AIS HC trap is degraded.

After the entire volume of desorbed HCs flow through the exhaust passage, the HEGO sensor reading may change from richer than stoichiometric to leaner than stoichiometric AFR. At 446, the diagnostic routine is completed and the engine may no longer be rotated. The controller may send a signal to the motor powering the engine to stop rotating the engine and the vehicle may return to the key-off condition. In one example, during the vehicle key-off condition, the FTIV may be maintained in an open position, the CVV may be maintained in an open position, and the CPV may be maintained in the closed position.

In this way, during an engine-off condition, an intake air system hydrocarbon (AIS HC) trap coupled to an intake manifold of the engine may be saturated by selectively routing fuel vapor from a fuel tank to the intake manifold, routing of the fuel vapor to the intake manifold may be stopped and then the AIS HC trap may be actively purged. During the active purging of the AIS HC trap, degradation of the AIS HC trap may be indicated in response to an air fuel ratio in an exhaust system of the engine being leaner than stoichiometric.

FIG. 5 shows an example timeline 500 illustrating diagnostics of air intake system hydrocarbon (AIS HC) trap (such as AIC HC trap 224 of FIG. 2) coupled to an engine intake manifold. The horizontal (x-axis) denotes time and the vertical markers t0-t7 identify significant times in the routine for diagnostics of the AIS HC trap.

The first plot, line 502, shows variation in engine speed over time. The engine may be rotated by combusting air and fuel in the engine cylinders or by operating an electric motor coupled to the hybrid electric vehicle (HEV). The second plot, line 504, shows operation of the HEV electric motor. The third plot, line 506, shows a position if a canister vent valve (such as CVV 297 in FIG. 2) housed in a vent line coupling a fuel vapor canister to the atmosphere. The fourth plot, line 507, shows a position of a canister purge valve (such as CPV 262 in FIG. 2) housed in a purge line coupling the fuel vapor canister to the engine intake manifold. The fifth plot, line 508, shows a position of the fuel tank isolation valve (such as FTIV 252 in FIG. 2) housed in a conduit coupling the fuel tank to the fuel vapor canister. The sixth plot, line 510, shows fuel tank pressure as estimated via a fuel tank pressure transducer (such as FTPT 291 in FIG. 2). Dashed line 509 shows a threshold fuel tank pressure above which the amount of fuel vapor generated in the fuel tank is sufficient to saturate an AIS HC trap. The seventh plot, line 512, shows an exhaust air fuel ratio (AFR) as estimated via an oxygen sensor (such as oxygen sensor 237 in FIG. 2) coupled to the exhaust passage. Dashed line 511 shows a stoichiometric exhaust AFR (air fuel ratio is 1:1). The eighth plot, line 514, shows a position of throttle coupled to the engine intake manifold. The ninth plot, line 516, shows operation of a fuel pump coupled to the fuel tank. The tenth plot, line 518, shows the position of a diagnostics flag indicating degradation of the AIS HC trap.

Prior to time t1, the engine is driven by combustion and is rotated for vehicle propulsion. The HEV machine is not operated for engine rotation or vehicle propulsion. The intake throttle is partially open proportional to the torque demand. The fuel pump is operated to supply fuel from the fuel tank to the engine cylinders via fuel injectors. The FTPT estimates the fuel tank pressure created due to vaporization of fuel in the fuel tank as the fuel pump is operated. The average exhaust air fuel ratio remains stoichiometric with fluctuations in the AFR between richer than stoichiometric and leaner than stoichiometric. The CPV and the FTIV are maintained in closed positions isolating the fuel tank and the fuel vapor canister from the intake manifold while the CVV may be maintained in an open position. Since diagnostics of the AIS HC trap is not carried out, the flag is maintained in the off position.

At time t1, the engine is shut-down by suspending operation of the fuel pump and also by disabling spark to the engine cylinders. The controller sends a signal to the FTIV to actuate the FTIV to an open position to route any fuel vapor from the fuel tank to the fuel vapor canister. Between time t1 and t2, the engine is maintained in the off condition. As the fuel vapor is removed from the fuel tank, the fuel tank pressure reduces.

At time t2, after a threshold duration has elapsed since the engine shut-down at time t1, diagnostics of the AIS HC trap is initiated by waking up the controller. The controller sends a signal to the HEV machine to spin the engine unfueled at a first engine speed. As the engine is rotated, any unburnt and un-adsorbed (residual) fuel vapors present in the engine intake system and the engine cylinders are routed to the atmosphere via the exhaust passage. Due to the lower pressure created in the intake manifold by engine rotation, ambient air may enter the engine intake manifold via the partially open intake throttle and flow to the exhaust passage carrying along the fuel vapors. Between time t2 and t3, as the fuel vapors flow through the exhaust passage, the exhaust AFR is estimated to be richer than stoichiometric.

At time t3, in response to the exhaust AFR changing from richer than stoichiometric to leaner than stoichiometric, it is inferred that the residual fuel vapors have been removed from the engine system via the exhaust manifold. The controller sends a signal to the HEV machine to suspend engine rotation. The controller sends a signal to the fuel pump to activate the fuel pump. The fuel tank is isolated by actuating the FTIV to a closed position. Between time t3 and t4, as the fuel pump is operated in an isolated fuel tank, fuel vapors are generated. The speed of operation of the fuel pump for fuel vapor generation is higher than the speed of operation of the fuel pump for fuel supply to the fuel injectors (such as prior to time t1). Due to fuel vapor generation, there is an increase in fuel tank pressure.

At time t4, in response to the fuel tank pressure increasing to above the threshold pressure 509, it is inferred that sufficient fuel vapor has been generated in the fuel tank to saturate the AIS HC trap. The threshold pressure 509 is calibrated by the controller based on the adsorption capacity of the AIS HC trap. In response to the fuel tank pressure increasing to above the threshold 509, the controller sends a signal to the fuel pump to suspend operation of the fuel pump. The controller sends signals to each of the actuator coupled to the CPV and the actuator coupled to the FTIV to open the respective valves (CPV and FTIV). Also the controller sends a signal to the actuator coupled to the CVV to close the CVV. By opening the FTIV and the CPV, the fuel vapor generated in the fuel tank is routed to the intake manifold via the fuel vapor canister and the canister purge line. As the CVV is closed, the vapor is not able to escape to the atmosphere via the canister vent line. Between time t4 and t5, as the fuel vapor flows from the fuel tank to the engine intake manifold, the fuel tank pressure reduces. Upon reaching the intake manifold, the fuel vapor is adsorbed by the AIS HC trap.

At time t5, it is inferred that a threshold duration has elapsed for the adsorption of the fuel vapors by the AIS HC trap. The controller sends a signal to the HEV machine to rotate the engine at the predetermined speed. The controller also sends a signal to the throttle plate to completely close the throttle. By spinning the engine with throttle closed, ambient air does not enter the engine intake manifold via the intake throttle and therefore there is an absence of air to desorb the fuel vapors which were adsorbed on the AIS HC trap. Between time t5 and t6, the un-adsorbed fuel vapors remaining in the intake manifold are routed to the atmosphere via the engine cylinders and the exhaust passage. As the fuel vapors flow through the exhaust passage, the AFR estimated via the exhaust oxygen sensor is richer than stoichiometric AFR.

At time t6, in response to the AFR changing from richer than stoichiometric to leaner than stoichiometric, it is inferred that the entire volume of un-adsorbed fuel vapors has escaped to the atmosphere via the exhaust passage. The controller sends a signal to the throttle plate to completely open the throttle. As the throttle is actuated to a wide open position with the engine spinning, ambient air enters the engine intake manifold. Also, the controller sends a signal to the actuator coupled to the CPV to close the CPV. Between time t6 and t7, as ambient air flows through the AIS HC trap under pressure, the adsorbed hydrocarbons are desorbed and are routed to the atmosphere via the exhaust passage. As the CPV is closed, the desorbed hydrocarbons cannot enter the purge line. Due to the presence of the desorbed hydrocarbons in the exhaust air stream, the exhaust AFR changes from leaner than stoichiometric AFR to richer than stoichiometric AFR. Based on the change in AFR to richer than stoichiometric AFR, it is inferred that the AIS HC trap is operating optimally and is able to adsorb and desorb hydrocarbons. Since the AIS HC trap is not degraded, the flag is maintained in the off state.

At time t7, in response to the AFR changing from richer than stoichiometric AFR to leaner than stoichiometric AFR, it is inferred that the entire volume of desorbed hydrocarbons have been routed to the atmosphere and the diagnostic routine is completed. The controller sends a signal to the HEV motor to stop spinning the engine. The intake throttle is actuated to the position of the throttle prior to initiation of the diagnostic routine (such as prior to time t2). After time t7, the vehicle is not propelled using engine torque and/or machine torque and the engine is maintained in the shut-down condition until a subsequent vehicle key-on.

However, between t6 and t7, even as ambient air is routed through the AIS HC trap, if it is observed that the AFR remains leaner than stoichiometric AFR (as shown by dashed line 513), it may be inferred that AIS HC trap cannot be purged as desired. The lack of hydrocarbons in the exhaust air flow may also indicate that the AIS HC trap was not able to adsorb the fuel vapors during time t4 and t5. Therefore, between time t6 and t7, as shown by dashed line 518, flag would have been set indicating the degradation of the AIS HC trap.

In this way, existing engine components such as the exhaust oxygen gas sensor may be re purposed for diagnostics of an AIS HC trap. The technical effect of carrying out the diagnostics using generated fuel vapors is that the diagnostic routine may be regularly carried out during engine-off conditions without having to wait for suitable engine operating conditions. Overall, by regularly monitoring the health of the AIS HC trap, bleed emissions may be reduced.

An example engine method comprises: during unfueled cranking of an engine, testing for degradation of an adsorbent material positioned in an intake of the engine by directing fuel vapor to the adsorbent material with a throttle coupled to the engine intake in closed position, and indicating presence or absence of degradation of the adsorbent material based on an air fuel ratio state in an exhaust system of the engine upon opening the throttle. In any preceding example, additionally or optionally, the adsorbent material positioned in the engine intake comprises an air intake system hydrocarbon (AIS HC) trap coupled to the engine intake downstream of the throttle, and wherein the adsorbent material includes one or more of carbon, activated carbon, or zeolites. In any or all of the preceding examples, additionally or optionally, the fuel vapor is directed to the adsorbent from an evaporative emissions control system coupled to a fuel tank, and wherein the fuel vapor is produced by operating a fuel pump coupled to the fuel tank, the method further comprising, prior to producing the fuel vapor, isolating the fuel tank by actuating a fuel tank isolation valve (FTIV) housed in a conduit coupling the fuel tank to a vapor canister of the evaporative emissions control system to a closed position. In any or all of the preceding examples, the method further comprises, additionally or optionally, prior to producing the fuel vapor, spinning the engine, unfueled, until the exhaust air fuel ratio is leaner than stoichiometric air fuel ratio. In any or all of the preceding examples, additionally or optionally, directing fuel vapor to the adsorbent material includes, estimating a vapor pressure in the fuel tank via a fuel tank pressure transducer coupled to the fuel tank, and in response to the vapor pressure increasing to above a threshold pressure, closing the throttle, opening the FTIV, opening a canister purge valve (CPV) housed in a passage coupling the vapor canister to the engine intake, closing a canister vent valve (CVV) housed in a passage coupling the vapor canister to atmosphere, and directing fuel vapor from the fuel tank to the engine intake. In any or all of the preceding examples, the method further comprises, additionally or optionally, upon directing the fuel vapor to the adsorbent material, allowing the fuel vapor to dwell in the engine intake for a threshold duration, and after the threshold duration has elapsed, spinning the engine, unfueled, with the throttle closed, until the exhaust air fuel ratio is leaner than stoichiometric air fuel ratio, and then opening the throttle to a fully open position. In any or all of the preceding examples, additionally or optionally, indication of presence of degradation of the adsorbent material is in response to the exhaust air fuel ratio changing from leaner than stoichiometric air fuel ratio to richer than leaner than stoichiometric air fuel ratio upon opening the throttle while spinning the engine, unfueled. In any or all of the preceding examples, additionally or optionally, indication of absence of degradation of the adsorbent material is in response to the exhaust air fuel ratio remaining leaner than stoichiometric air fuel ratio upon opening the throttle while cranking the engine, unfueled. In any or all of the preceding examples, additionally or optionally, the engine is coupled to vehicle, and wherein unfueled cranking of the engine includes spinning the engine via an electric motor when the vehicle is in a key-off condition. In any or all of the preceding examples, additionally or optionally, the exhaust air fuel ratio is estimated via a heated exhaust gas oxygen sensor coupled to the exhaust system of the engine. In any or all of the preceding examples, the method further comprising, additionally or optionally, during an immediately subsequent engine operation, in response to indication of a degraded adsorbent material, upon completion of an immediately subsequent engine cycle, spinning the engine unfueled to route fuel vapor from the engine intake to one or more catalysts coupled to the exhaust system, via engine cylinders. Another example engine method comprises: during an engine-off condition, saturating an intake air system hydrocarbon (AIS HC) trap coupled to an intake manifold of the engine by routing fuel vapor from a fuel tank to the intake manifold, stopping the fuel vapor routing to the intake manifold and then actively purging the AIS HC trap, and indicating degradation of the AIS HC trap in response to an air fuel ratio in an exhaust system of the engine being leaner than stoichiometric during the active purging of the AIS HC trap. In any preceding example, additionally or optionally, the saturating the AIS HC trap includes, actuating a fuel tank isolation valve (FTIV) housed in a conduit coupling the fuel tank to a vapor canister of an evaporative emissions control system to a closed position, operating a fuel pump coupled to the fuel tank until a fuel vapor pressure in the fuel tank increases to a threshold pressure, and then routing fuel vapor from the fuel tank to the AIS HC trap. In any or all of the preceding examples, additionally or optionally, routing of fuel vapor from the fuel tank to the AIS HC trap includes opening the FTIV, opening a canister purge valve (CPV) housed in a passage coupling the vapor canister to the intake manifold, and closing a canister vent valve (CVV) housed in a passage coupling the vapor canister to atmosphere and wherein stopping the fuel vapor routing to the intake manifold includes closing the CPV. In any or all of the preceding examples, the method further comprising, additionally or optionally, after stopping the fuel vapor routing to the intake manifold, cranking the engine, unfueled, actuating a throttle coupled to the intake manifold upstream of the AIS HC trap to a closed position, monitoring the exhaust air fuel ratio via an oxygen sensor coupled to an engine exhaust manifold of the exhaust system, and in response to the exhaust air fuel ratio being leaner than stoichiometric air fuel ratio, actively purging the AIS HC trap. In any or all of the preceding examples, additionally or optionally, actively purging the AIS HC trap includes, cranking the engine, unfueled, and actuating the throttle to a wide open position to flow ambient air to the engine exhaust manifold via the AIS HC trap. In any or all of the preceding examples, additionally or optionally, the engine propels a vehicle which comprises an autonomous vehicle and/or a hybrid vehicle, and wherein the engine is cranked via an electric motor during a vehicle key-off condition.

In yet another example, a system comprises: a vehicle, including an autonomous vehicle and/or a hybrid vehicle, an electric machine, an engine including an intake passage and an exhaust passage, an intake throttle coupled to the intake passage, a fuel vapor canister selectively coupled to the engine intake passage via a canister purge valve (CPV), a fuel tank that supplies fuel to the engine, the fuel tank selectively coupled to the fuel vapor canister via a fuel tank isolation valve (FTIV), a fuel pump housed in the fuel tank, an air intake system hydrocarbon (AIS HC) trap positioned in the engine intake passage, a heated air exhaust gas oxygen (HEGO) sensor coupled to the exhaust passage, and a controller with computer readable instructions stored on non-transitory memory that when executed during an engine-off condition, cause the controller to: isolate the fuel tank by closing the FTIV and operating the fuel pump to generate fuel vapors, route the generated fuel vapor to the AIS HC trap by opening the FTIV and the CPV, spin the engine, unfueled, via the electric machine and open the throttle to a wide open position after stopping the route of fuel vapor to the AIS HC trap, and responsive to an exhaust air fuel ratio being leaner than stoichiometric air fuel ratio, indicate degradation of the AIS HC trap. In any preceding example, additionally or optionally, stopping the route of fuel vapor to the AIS HC trap includes stopping operation of the fuel pump and closing the CPV. In any or all of the preceding examples, additionally or optionally, the controller includes further instructions for: during spinning the engine with the wide open throttle, responsive to the exhaust air fuel ratio being richer than stoichiometric air fuel ratio, indicating the AIS HC trap not degraded.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:

during unfueled cranking of an engine, testing for degradation of an adsorbent material positioned in an intake of the engine by directing fuel vapor to the adsorbent material with a throttle coupled to the engine intake in a closed position, and indicating presence or absence of degradation of the adsorbent material based on an air fuel ratio state in an exhaust system of the engine upon opening the throttle.

2. The method of claim 1, wherein the adsorbent material positioned in the engine intake comprises an air intake system hydrocarbon (AIS HC) trap coupled to the engine intake downstream of the throttle, and wherein the adsorbent material includes one or more of carbon, activated carbon, or zeolites.

3. The method of claim 1, wherein the fuel vapor is directed to the adsorbent material from an evaporative emissions control system coupled to a fuel tank, and wherein the fuel vapor is produced by operating a fuel pump coupled to the fuel tank, the method further comprising, prior to producing the fuel vapor, isolating the fuel tank by actuating a fuel tank isolation valve (FTIV) housed in a conduit coupling the fuel tank to a vapor canister of the evaporative emissions control system to a closed position.

4. The method of claim 3, further comprising, prior to producing the fuel vapor, spinning the engine, unfueled, until an exhaust air fuel ratio is leaner than a stoichiometric air fuel ratio.

5. The method of claim 3, wherein directing fuel vapor to the adsorbent material includes estimating a vapor pressure in the fuel tank via a fuel tank pressure transducer coupled to the fuel tank, and in response to the vapor pressure increasing to above a threshold pressure, closing the throttle, opening the FTIV, opening a canister purge valve (CPV) housed in a passage coupling the vapor canister to the engine intake, closing a canister vent valve (CVV) housed in a passage coupling the vapor canister to atmosphere, and directing fuel vapor from the fuel tank to the engine intake.

6. The method of claim 1, further comprising, upon directing the fuel vapor to the adsorbent material, allowing the fuel vapor to dwell in the engine intake for a threshold duration, and after the threshold duration has elapsed, spinning the engine, unfueled, with the throttle closed, until an exhaust air fuel ratio is leaner than a stoichiometric air fuel ratio, and then opening the throttle to a fully open position.

7. The method of claim 1, wherein indication of the presence of degradation of the adsorbent material is in response to an exhaust air fuel ratio changing from leaner than a stoichiometric air fuel ratio to richer than a stoichiometric air fuel ratio upon opening the throttle while spinning the engine, unfueled.

8. The method of claim 1, wherein indication of the absence of degradation of the adsorbent material is in response to an exhaust air fuel ratio remaining leaner than a stoichiometric air fuel ratio upon opening the throttle while cranking the engine, unfueled.

9. The method of claim 1, wherein the engine is coupled to a vehicle, and wherein unfueled cranking of the engine includes spinning the engine via an electric motor when the vehicle is in a key-off condition.

10. The method of claim 1, wherein the exhaust air fuel ratio is estimated via a heated exhaust gas oxygen sensor coupled to the exhaust system of the engine.

11. The method of claim 1, further comprising, during an immediately subsequent engine operation, in response to indication of a degraded adsorbent material, upon completion of the immediately subsequent engine cycle, spinning the engine unfueled to route fuel vapor from the engine intake to one or more catalysts coupled to the exhaust system via engine cylinders.

12. An engine method, comprising:

during an engine-off condition, saturating an intake air system hydrocarbon (AIS HC) trap coupled to an intake manifold of an engine by selectively routing fuel vapor from a fuel tank to the intake manifold;

stopping the fuel vapor routing to the intake manifold and then actively purging the AIS HC trap; and indicating degradation of the AIS HC trap in response to an air fuel ratio in an exhaust system of the engine being leaner than stoichiometry during the active purging of the AIS HC trap.

13. The method of claim 12, wherein the saturating the AIS HC trap includes:

actuating a fuel tank isolation valve (FTIV) housed in a conduit coupling the fuel tank to a vapor canister of an evaporative emissions control system to a closed position, operating a fuel pump coupled to the fuel tank until a fuel vapor pressure in the fuel tank increases to a threshold pressure, and then routing fuel vapor from the fuel tank to the AIS HC trap.

14. The method of claim 13, wherein routing of fuel vapor from the fuel tank to the AIS HC trap includes:

opening the FTIV, opening a canister purge valve (CPV) housed in a passage coupling the vapor canister to the intake manifold, and closing a canister vent valve (CVV) housed in a passage coupling the vapor canister to atmosphere, wherein stopping the fuel vapor routing to the intake manifold includes closing the CPV.

15. The method of claim 12, further comprising, after stopping the fuel vapor routing to the intake manifold, cranking the engine, unfueled, actuating a throttle coupled to the intake manifold upstream of the AIS HC trap to a closed position, monitoring the exhaust air fuel ratio via an oxygen sensor coupled to an engine exhaust manifold of the exhaust system, and in response to the exhaust air fuel ratio being leaner than a stoichiometric air fuel ratio, actively purging the AIS HC trap.

16. The method of claim 15, wherein actively purging the AIS HC trap includes cranking the engine, unfueled, and actuating the throttle to a wide open position to flow ambient air to the engine exhaust manifold via the AIS HC trap.

17. The claim of method 15, wherein the engine propels a vehicle which comprises an autonomous vehicle and/or a hybrid vehicle, and wherein the engine is cranked via an electric motor during a vehicle key-off condition.

18. A system, comprising:

a vehicle, including an autonomous vehicle and/or a hybrid vehicle;

an electric machine;

an engine including an intake passage and an exhaust passage;

an intake throttle coupled to the intake passage;

a fuel vapor canister selectively coupled to the engine intake passage via a canister purge valve (CPV);

a fuel tank that supplies fuel to the engine, the fuel tank selectively coupled to the fuel vapor canister via a fuel tank isolation valve (FTIV);

a fuel pump housed in the fuel tank;

an air intake system hydrocarbon (AIS HC) trap positioned in the engine intake passage;

a heated air exhaust gas oxygen (HEGO) sensor coupled to the exhaust passage; and a controller with computer readable instructions stored on non-transitory memory that when executed during an engine-off condition, cause the controller to:

isolate the fuel tank by closing the FTIV and operating the fuel pump to generate fuel vapors;

route the generated fuel vapor to the AIS HC trap by opening the FTIV and the CPV;

spin the engine, unfueled, via the electric machine and open the throttle to a wide open position after stopping the route of fuel vapor to the AIS HC trap; and responsive to an exhaust air fuel ratio being leaner than a stoichiometric air fuel ratio, indicate degradation of the AIS HC trap.

19. The system of claim 18, wherein stopping the route of fuel vapor to the AIS HC trap includes stopping operation of the fuel pump and closing the CPV.

20. The system of claim 18, wherein the controller includes further instructions for:

during spinning the engine with the wide open throttle, responsive to the exhaust air fuel ratio being richer than the stoichiometric air fuel ratio, indicating the AIS HC trap is not degraded.

* * * * *